United States Patent [19]

Groswith, III et al.

[11] Patent Number: 4,893,836

[45] Date of Patent: Jan. 16, 1990

[54] BOOK BINDING CONNECTOR AND BINDING-DEBINDING TOOL

[75] Inventors: Charles T. Groswith, III, Los Altos; Edwin A. Seipp III, Menlo Park, both of Calif.; Thomas P. Myers, Cleveland Heights, Ohio

[73] Assignee: Taurus Holdings, Inc., Mountain View, Calif.

[21] Appl. No.: 169,558

[22] Filed: Mar. 17, 1988

[51] Int. Cl.$^4$ .................................................. B42B 5/08
[52] U.S. Cl. ...................................... 281/28; 281/21.1; 412/43
[58] Field of Search .............................. 412/43, 6, 33; 281/21 R, 28, 21.1, 28

[56] References Cited

U.S. PATENT DOCUMENTS

| | | |
|---|---|---|
| 635,409 | 10/1899 | Van Sickle . |
| 1,841,989 | 1/1932 | Smith . |
| 1,845,671 | 2/1932 | Lotter . |
| 3,647,306 | 3/1972 | Chamberlin . |
| 3,834,759 | 9/1974 | Abildgaard et al. . |
| 3,970,331 | 7/1976 | Giulie . |
| 4,175,880 | 11/1989 | Muller . |
| 4,369,013 | 1/1983 | Abildgaard et al. . |
| 4,730,972 | 3/1988 | Sun et al. ................... 28 L/21 R |

FOREIGN PATENT DOCUMENTS 2505262 11/1982 France .
950768 2/1964 United Kingdom .

Primary Examiner—Paul A. Bell
Attorney, Agent, or Firm—Skjerven, Morrill, MacPherson, Franklin & Friel

[57] ABSTRACT

A binding member having a pair of spaced ratcheted-surfaced posts which includes a bifurcated rim separated by an open groove, and extending from a binding member head. The binding member head is insertible into a counterbore in a paper sheets stack binding strip, the strip having an aperture through which the binding member posts are inserted. The rim includes a beveled ridge which passes through the strip aperture and snap locks into an exit portion of the aperture on a side of the strip opposite the counterbore. A finger-operated flat push disc binding/debinding tool is utilized to push and ratchet a pawl-containing locking collar on the posts and into a strip counterbore to clamp a paper sheets stack. An edge of the disc is insertible between the posts for breaking off excess length of a post extending from the strip and locking collar. The disc also contains a bifurcated bit for shearing from the posts. In the case of a thin bound stack of paper sheets, the open groove in the bifurcated rim accommodates a sheared pawl and allows debinding of the locking collar from the binding member.

16 Claims, 3 Drawing Sheets

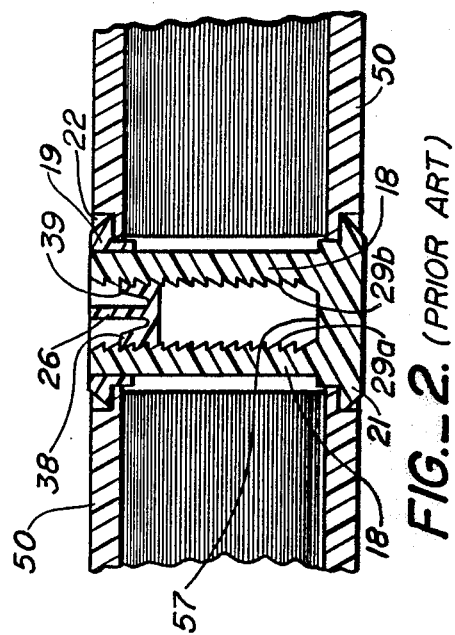
FIG._2. (PRIOR ART)
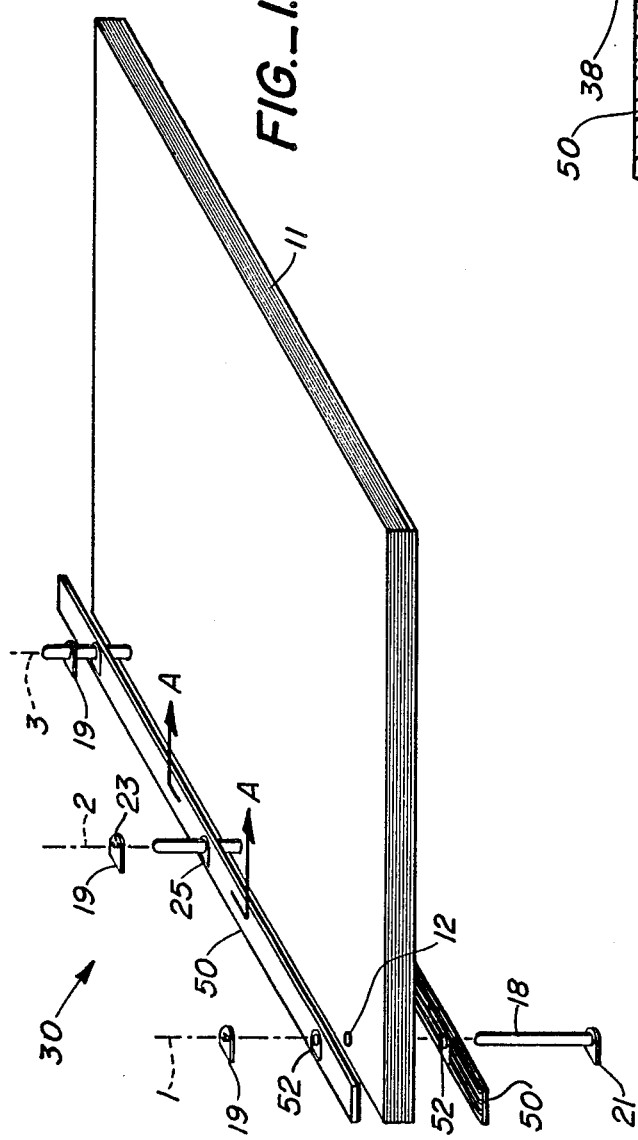
FIG._1. (PRIOR ART)

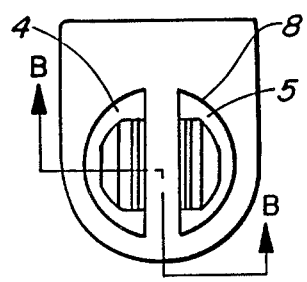
FIG._3A.
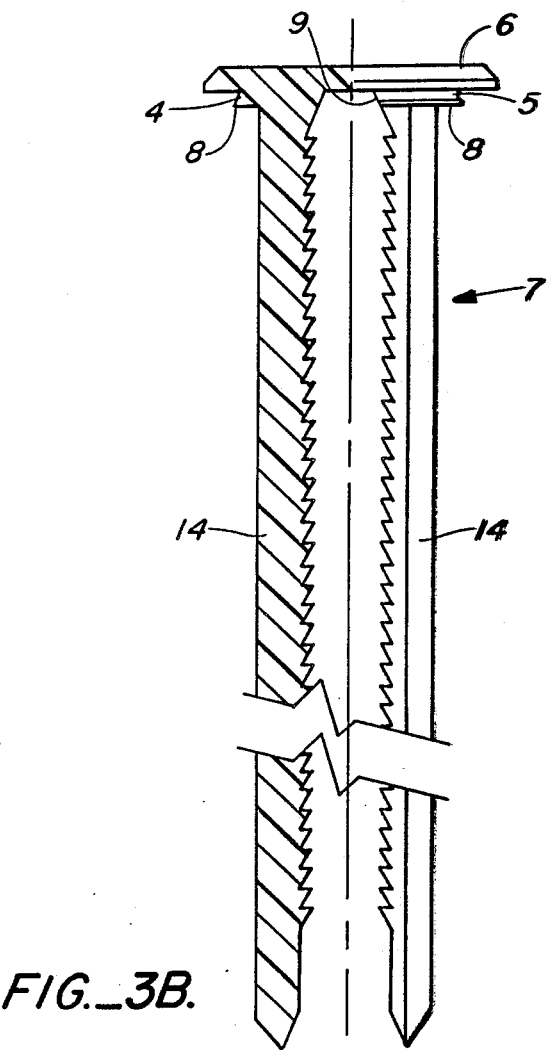
FIG._3B.
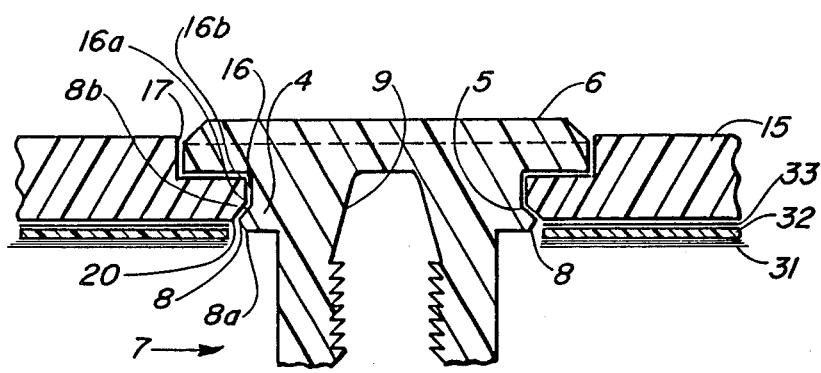
FIG._4.

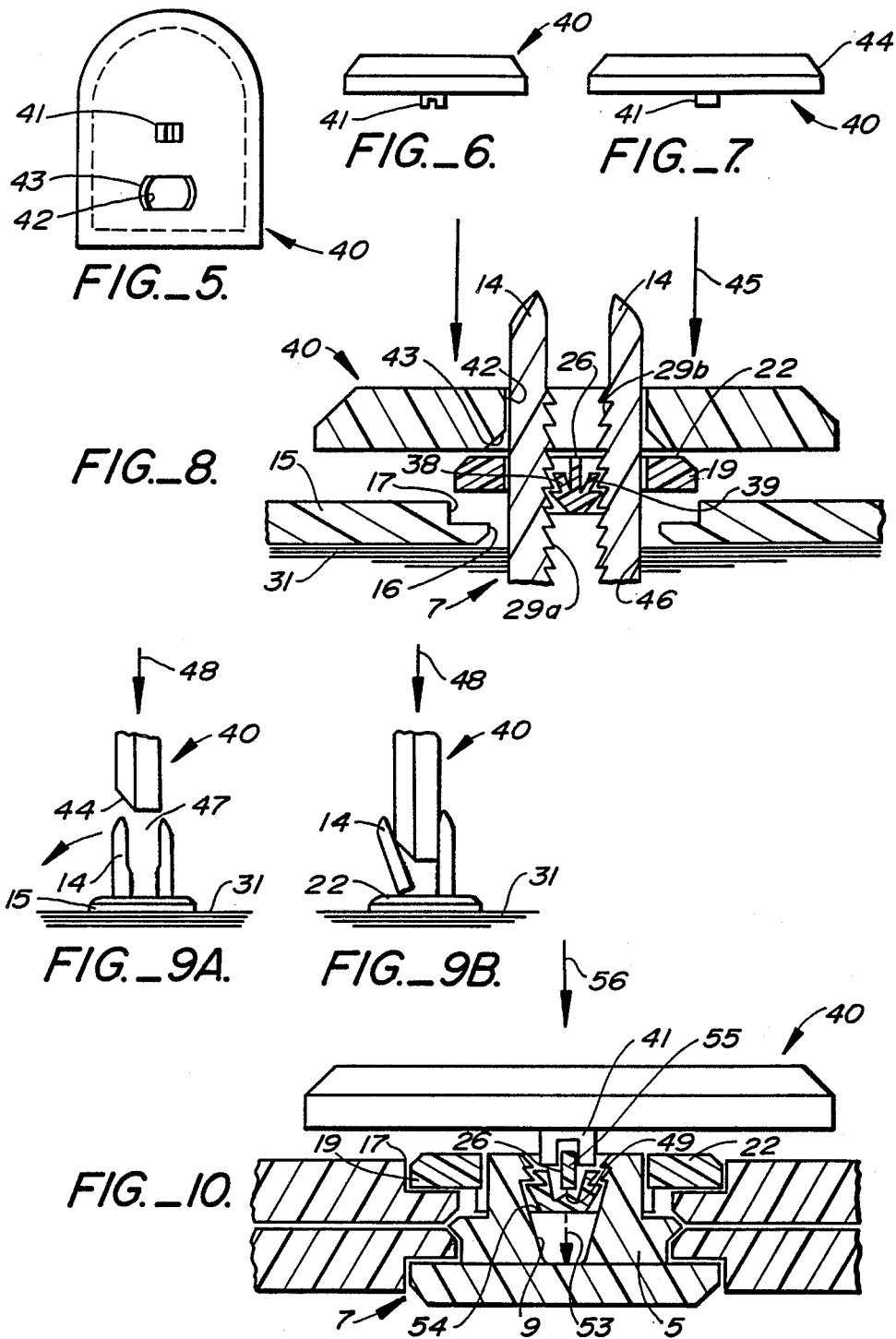

BOOK BINDING CONNECTOR AND BINDING-DEBINDING TOOL

RELATED APPLICATION

This application relates to U.S. applications Ser. No. 06/840,124, filed 3/14/86, now U.S. Pat. No. 4,730,972, Ser. No. 06/924,374, filed 10/19/86, now U.S. Pat. No. 4,743,048, Ser. No. 07/120,069, filed 11/13/87, and Design applications Ser. No. 121,762, filed 11/13/87, Ser. No. 121,763, filed 11/13/87, and Ser. No. 121,764, filed 11/13/87, all applications being assigned to the Assignee of this application. The subject matter of these related applications are incorporated herein by reference.

BACKGROUND OF THE INVENTION

Field of the Invention

This invention pertains to a paper sheets or book binding system for retaining and clamping an apertured margin portion of apertured material such as a stack of hole punched paper sheets and to the debinding of the stack. More particularly, the invention is directed to an improved binding connector(s) to bind a sheaf of papers into a bound report or booklet without the necessity of a tool or any machine. A simple finger or hand operated tool may assist in binding and debinding the bound booklet.

Material Information

The first related application discusses various binding systems utilized in the past including ACCO fasteners, spiral binders, and various interlocking through hole devices, exemplified by U.S. Pat. Nos. 3,970,331; 4,175,880; 4,369,013; 3,834,739; 1,841,989; U.K. Pat. No. 950,768; and French Pat. No. 2,505,262. The related applications generally disclose a first binding element including a bifurcated post, having inwardly facing ratcheted surfaces, with an integral head or integrally attached binding strip, the post(s) being passed through punch hole aperture(s) of a paper stack. Also provided is a separate locking button or collar with an integral head, used with or without a margin strip, which button includes one or two hinged pawls which are cinched on the bifurcated clamping a stack of paper sheets between the respective heads or strips. Excess post length is broken off adjacent this locking collar.

SUMMARY OF THE INVENTION

An improved book binding system is disclosed which utilizes in its preferred embodiment a double-beveled rim extending from the head of the post connector member which permits the head of that member to "click" lock into a connector strip or cover positioned along an edge of the paper stack. Further, a groove is provided in the rim adjacent the base of the bifurcated posts which provides a relief volume to allow shearing of the pawls from a locking collar cross-bar in those instances where only a relatively few sheets of paper form the bound booklet and there is insufficient travel possible for the pawls to be sheared, i.e. the cross-bar bottoms out before the pawl is sheared.

Additionally, an inexpensive flat plastic disc tool is disclosed which has four discrete applications, namely (1) used in binding to push the locking collar down over the posts into locking position, (2) includes a beveled edge which is inserted edgewise between the spaced posts to accurately break off the excess length of a post in the binding operation, (3) includes a bifurcated bit which extends from a surface of the disc which bit straddles the cross-bar and is operable to shear the locked pawls from the posts and debind the bound book, and (4) including a relative draft angle on the bit and the cross-bar such that the cross-bar is gripped by the bit and after shearing, lifts the cross-bar and collar away from the remaining parts of the binding connector when the tool is withdrawn.

The beveled rim improvement is used with a counterbored binding strip or cover with or without an in situ counterbore into which a headed post is inserted. The other improvements find utility with or without binding strips.

BRIEF DESCRIPTION ON OF THE DRAWINGS

FIG. 1 is an exploded perspective view of a related application prior art binding system prior to complete assembly of a binding.

FIG. 2 is a cross sectional view of the binding elements taken on the line A—A of FIG. 1.

FIG. 3A is a bottom view of the binding element of the invention including a bifurcated post.

FIG. 3B is a cross sectional view of the binding element of the invention taken on the line B—B of FIG. 3.

FIG. 4 is a cross-sectional partial view of the binding element the invention showing it in locking position in a strip aperture.

FIG. 5 is a top view of the paper sheets binding and debinding tool of the invention.

FIG. 6 is an end view of the tool.

FIG. 7 is a side view of the tool.

FIG. 8 illustrates the use of the tool of the invention to assemble a locking collar on a post binding member in a counterbore of an apertured binding strip on one side of a paper sheets stack.

FIG. 9A illustrates a first step in an additional use of the tool in breaking off excess length of a post after the locking collar and post connector member have clamped a paper sheets stack together.

FIG. 9B illustrates a second completion step showing the tool breaking off excess length of a post of the connecting element.

FIG. 10 illustrates another use of the tool for debinding a paper sheets stack bound with a post binding member and locking collar

DETAILED DESCRIPTION

FIG. 1 illustrates a prior art basic binding system 30 as shown in related application Ser. No. 07/120,069 in which a stack of paper sheets 11 are bound without a cover but with a pair of binding strips 50 and post binding members 18 and locking collars 19. Strips 50 are apertured at 52 and the bifurcated posts of binding element 18 are passed therethrough and through apertures 12 at an edge margin of the paper stack. Steps 1, 2 and 3 illustrate how the binding element and locking collar are positioned and connected to form the overall binding. In Step 1 a binding member 18 having an asymmetric or other shaped head 21 is inserted into the apertures 52 of the strips, cover apertures, if present, and through the stack apertures 12. At the start of Step 2, the posts 18 extend outwardly from top strip 50. A locking collar 19 having a pair of matched apertures 23 is then placed over the pair of posts and slid down as shown at Step 3 so that a pair of pawls 38, 39 attached to a cross-bar 26, incorporated into locking collar 19 (FIG. 2), ratchet down ratcheted surfaces 29a, 29b, (FIG. 2) on the inner facing periphery of posts 18 until the binding strips are cinched down to bind the paper sheets stack. Any excess length of the posts 18 are then snapped off or frangibly broken in the plane of a top surface 22 of the locking collar 19. Strips 50 contain on their exposed surfaces a series of recesses or counterbores 25 for receiving the head 21 of the post binding member and the headed locking collar 19.

FIGS. 3A and 3B show one aspect of the present invention where the prior art post connector member is and Serial No. 121,764, filed 11/13/87, modified to "click" lock into a strip aperture while the head of the post binding member is being seated into a strip or cover counterbore. Rather than a 360° full circle cylindrical rim as provided in related application Ser. No. 07/120,069, two approximately semicircular rim segments 4, 5, forming a bifurcated rim, are provided which extend longitudinally from the head 6 of post connector member 7. An integral double-beveled edge 8 is provided around and extending laterally from rim segments 4, 5. The rim segments are separated by an open groove or gulley 9 extending across the underside of head 6 adjacent the root portions of the integral posts 14. The function of this groove will be explained with respect to FIG. 10.

FIG. 4 shows the head rim segment and double-beveled edge construction of the FIG. 3B post connector member in more detail and in conjunction with a binding strip 15 having multiple spaced apertures 16 therein. A counterbore 17 is provided on the outer side of the strip 15 to receive the head 6 of post connector member. A beveled peripheral reentrant exit portion 20 surrounds aperture 16 on the strip under surface opposite the strip top surface containing the counterbore. The outer diameter of the peripheral edge or ridge 8 is slightly (about 0.05 to about 0.10 mm) greater that the diameter of aperture 16 so that upon insertion of post connector member 7 into the strip aperture 16 and counterbore 17, it is "click" locked into the strip. This is accomplished by action first of a first bevel 8a on the upper peripheral edge 16b of aperture 16 which moves the posts inwardly by a camming action, followed by a sliding action of the ridge 8 against the internal surface of aperture 16 and then by the ridge 8 (and posts) snapping out and back to their original position with respect to their original longitudinal axis so as to lock in the position shown inward of the lower peripheral edge 16a of aperture 16 where a second inner bevel 8b of the edge is captured by the reentrant exit portion 20.

An audible "click" is heard when the ridge passes through the aperture and locks in place adjacent strip exit portion 20. This enables a user to ascertain that the post connector element is correctly seated in the counterbore of the strip. It also holds a post connector member firmly in a strip so that a user can reorient the member and strip in any spacial position prior to assembly in a paper stack without the member(s) dropping out of the strip. As in the prior art post connectors, the strip is cinched up by placement of a locking collar over the posts and the locking collar ratcheted down over the posts so as to hold the strip 15 and a locking collar strip on opposite sides of a margin edge of a paper sheets stack 31 (partially shown) and a cover 32 generally adhered by adhesive 33 to the underside of strip 15.

It is contemplated that the connector of FIGS. 3A and 3B may be employed with an apertured flat cover with a proper hole size to accommodate the rim 4 and with sufficient stiffness so that the hole does not distort when the double beveled rim is pushed through. The connector may also be used with those covers disclosed in related application Ser. No. 06/924374, provided that the in situ counterbore formed by the multi-folded cover edge are also sized to accommodate the connector head, the capture aperture sized to allow passage of the rim, and where the edges of the capture aperture also do not distort upon insertion of the double beveled rim.

FIGS. 5-7 show a binding/debinding tool in the general form of an essentially flat finger-engageable push disc 40. While disc 40 is shown as D-shaped corresponding to the preferred shape of the post connector member head and the locking collar head, it may be of another configuration such as circular, square or oval. A bifurcated bit 41 extends outwardly from one of the flat surfaces of the disc. The function of this bit is explained with respect to FIG. 10. An aperture 42 is provided extending through the disc to accommodate the pair of posts of the post connector member (FIG. 8). The aperture 42 preferably has an entrance bevel 43 to aid in guiding the tool onto and over the post ends. In physical size, the push disc is about 3 cm in length, 2.5 cm in width and 0.6 cm in thickness. An edge bevel 44, preferably of about 45°, extends over about 0.4 cm of the disc peripheral edge when used with posts which have about a 0.3 cm separation. The disc may be made of relatively hard, high impact grade of plastic (such as polycarbonate) with the bit either integral therewith of the same material or in the form of a molded-in-place or subsequently attached metal bit. The aperture 42 may be used to hand the tool on a peg or nail so that it is convenient to the binding work station.

FIG. 8 illustrates the use of the tool 40 in binding a document or stack of paper sheets. Post connector member 7 is first passed through the apertures 46 in paper stack 31 through aperture 16 in strip 15. Locking collar 19 is then placed over the posts and the aperture 42 of tool 40 placed over the posts so that it seats on top of the locking collar 19. Thumb or finger pressure on the top surface of disc 40 (as indicated by arrows 45) forces collar 19 downward so that the pawls 38, 39 ratchet down ratchets 29a, 29b facing each other on the posts 14. When the strips on both sides of the stack are cinched against the paper stack by the downward pressing of the collar by the disc, the disc is removed from the excess length of posts extending outwardly from the surface 22 of the locking collar. The tool affords a user a wider and more easily reached surface than surface 22 to push so as to seat the collar into locking position on the post connector member to bind the paper stack or book.

As shown in FIGS. 9A and 9B, the disc also functions to initiate and break off one of the post legs. Rather than a user forcing his or her's own finger into the space between the excess length of posts to effect breakage, the tool 40 is used edgewise so that bevel 44 enters the space 47 between the excess length of posts extending from the bound document. Upon pushing the beveled edge between and lengthwise of the posts as indicated by arrows 48, one of the frangible posts 14 breaks off as indicated, adjacent its root, with the top surface 22 of the locking collar. The disc thickness is greater than the spacing between the posts on a common head. The disc thickness dimension is a function of the post spacing, the material frangibility, the bevel angle, and the bevel height.

FIG. 10 illustrates third and fourth functions of tool 40. The tool may be oriented so that bifurcated bit 41 straddles the cross-bar 26 of locking collar 19 and is seated against the free end of pawls 38, 39. Upon finger or palm pressure (approximately 30-40 pounds) or a sharp rap (kinetic energy) by the user's hand edge or palm as shown by arrow 56, the pawls may be sheared at their connection 49 with the bottom of the cross-bar 26, so as to debind the binding. This aspect of debinding is similar to the debinding by the elongated tool shown in related application Ser. No. 07/120,069. A particular problem has existed however in this prior art when debinding a thin booklet or stack of only a few sheets of stacked paper. This condition exists when a bound document has only 10–15 sheets but is dependent on the paper thickness and whether covers and/or binding strips are employed. In such event, the cross-bar support posts and pawls bottomed out on the underside of post head of the prior art (illustrated by phantom line 54 and corresponding to the surface 57 in the prior art) and the pawls did not shear off when rapped by a bifurcated bit of the prior art elongated tool. To solve this problem, an open groove 9 is provided in the post connector member 7, more specifically between rims 4, 5, which allows the pawls to be sheared and driven down into the groove past any remaining post ratchets, as indicated by arrow 53. The cross-bar or the bit may be provided with a relative draft angle 55 so that when the pawls are sheared off and drive below the cross-bar, the cross-bar and the remainder of the locking collar is frictionally engaged with the bifurcated bit. When the disc is removed from its rapped position, it pulls the cross-bar and integral collar out of the strip counterbore 17. The broken pawls can be shaken or dropped out of the groove 9 after the broken collar and cross-bar are pulled off the end of the bifurcated bit. Once debound, the book may be modified by adding or removing sheets of the paper stack. The binding strips are reusable as are the post connector members if an appreciably less number of sheets are to be bound than formerly bound, or a new post may be snapped into position and locked in place with a new collar while reusing the strip and covers.

Tool 40 may be utilized to press locking collars on, to remove excess lengths of posts from, and to debind connectors which directly cinch a stack of paper sheets with or without the use of binding strips against the margins of a stack of paper sheets The above description of embodiments of this invention is intend to be illustrative and not limiting. Other embodiments of this invention will be obvious to those skilled in the art in view of the above disclosure.

We claim:

1. A paper sheets stack binding and debinding tool for a binding connector having headed ratchet-containing spaced posts passing through an aperture in a paper sheets stack and a headed pawl-containing locking collar, said tool comprising an essentially flat disc having a through-aperture to accommodate a pair of spaced connector posts, a finger-engageable surface and a locking collar-engageable surface for ratcheting and engaging a locking collar of a binding connector and said pair of connector posts together to hold a stack of paper sheets; and a debinding bit extending from a surface of said disc to shear an engaged pawl from said locking collar and allow separation of said pair of connector posts from said locking collar.

2. The apparatus of claim 1 in which said flat disc has and edge thickness greater than the spacing between said pair of connector posts, and wherein, after clamped assembly of said stack of paper sheets by said pair of connector posts and said locking collar, excess length of one of said connector posts extending outward of said stack of paper sheets from said locking collar is broken off by insertion of said disk edge between said pair or connector posts.

3. The apparatus of claim 2 wherein said disc edge is beveled such that one of said pair of connector posts is broken off adjacent to its root.

4. An apertured paper sheets binding connector comprising:
a binding member including a pair of elongated parallel spaced posts integrally extending from a common head, said common head having a D-shaped configuration, said posts having at least one ratcheted surface thereon, and an integral rim extending longitudinally from said common head adjacent root portions of said posts, said rim including a double-bevelled peripheral ridge adjacent an extremity of said rim;
a locking collar having a pair of matching through-apertures, an integral medial cross-bar extending between and separating said apertures, and at least one pawl hingedly mounted to said cross-bar, said through-apertures allowing sliding passage of said posts therepast and said at least one pawl to ratchet along said at least one ratcheted surface of said posts, said locking collar having a D-shaped configuration; and
a pair of multi-apertured binding strips positionable along opposed margins of a stack of paper sheets adjacent at least two paper sheets apertures; and where each aperture of each of said strips includes a D-shaped counterbore therein, said locking collar head and said binding member common head being insertable oppositely into each of said counterbores in opposed ones of said pairs of strips to clamp a stack of paper sheets together, and where said peripheral ridge of said binding member has a diameter greater than a diameter of a strip aperture such that said binding member is click locked into said strip aperture upon insertion of said common head into a counterbore receiving said common head.

5. The binding connector of claim 4 wherein said double-bevelled peripheral ridge includes a first bevel having a first outer diameter less than the diameter of said strip aperture whereby upon insertion of said ridge into said strip aperture, said posts are moved inwardly by a camming action, and a second inner diameter greater than the diameter of said strip aperture adjacent to a second bevel extending inwardly toward said posts, said second bevel being captured by an exit portion of said strip aperture on a strip side opposite said counterbore.

6. The binding connector of claim 4 in which said integral rim is bifurcated and includes an open groove parallel to said posts ratcheted surfaces extending across said rim to accommodate said at least one pawl when said at least one pawl is excised from said cross-bar to debind said stack of paper sheets.

7. The binding connector of claim 4 wherein said at least one pawl is a pair of pawls and further including a bifurcated bit insertable into said strip counterbore and locking collar along opposite sides of said cross-bar and against said pair of pawls for shearing said pawls to allow separation of a locked locking collar from said binding member, said bit extending from an essentially flat band or finger-engageable push disc.

8. The binding connector of claim 7 wherein said cross-bar and said bifurcated bit have a relative draft angle such that, upon shearing, said cross-bar is gripped by said bit and said locking collar is removable from a strip counterbore and said binding connector when said bifurcated bit is removed from insertion in said strip counterbore.

9. The binding connector of claim 7 in which said push disc has a flat finger-engageable surface and a flat locking collar-engageable surface for pushing said locking collar down on said posts and over said ratcheted surfaces to clamp said stack of paper sheets together, said disc including a through-aperture for said pairs of posts.

10. The binding connector of claim 9 in which said disc through-aperture is beveled to guide entry of said pairs of posts therein.

11. The binding connector of claim 4, further including an essentially flat push disc having a beveled edge and having a thickness greater than the spacing of said elongated posts, said edge being insertable between an excess length of said posts extending from said locking collar after said locking collar has been positioned in a strip counterbore to frangibly break off an excess length of one of said posts adjacent to said locking collar.

12. An apertured paper sheets binding connector comprising:
   a binding member including a pair of elongated parallel posts integrally extending from a common head, an integral rim extending from said common head adjacent root portions of said posts, an open groove bifurcating said rim to separate said posts, said posts including at least one inwardly facing ratcheted surface extending out from said open groove;
   a locking collar having a pair of matching through-apertures, an integral medial cross-bar extending between and separating said apertures, and at least one pawl hingedly mounted to said cross-bar, said apertures including oppositely disposed sections, corresponding to and allowing sliding passage of said posts therepast;
   wherein said posts are insertable into at least one paper sheets aperture from one side of a stack of apertured paper sheets and through said locking collar, said locking collar including a head juxtaposed to a paper sheets aperture on an opposite side of said stack of apertured paper sheets;
   wherein at least one pawl ratchets along said at least one ratcheted surface until said posts common head and said locking collar head clamp said stack of apertured paper sheets together; excess length of said posts being breakable across a cross section of said posts from a root of one ratchet of said ratcheted surface across said posts generally in a plane of an exterior surface of said locking collar head; and
   further including means for shearing, said means for shearing including a bifurcated bit with a fixed bit spacing, for shearing said at least one pawl from said cross-bar to debind said binding connector, binding member open groove being of sufficient volume to accommodate said at least one pawl after said at least one pawl has been sheared from said cross bar and driven down past said at least one ratcheted surface of said posts into said open groove.

13. The binding connector of claim 12 wherein said bifurcated bit extends from an essentially flat finger-engageable push disc said bit being insertable over said cross-bar and operable downward to shear said at least one pawl from said cross-bar to debind said connector.

14. An apertured paper sheets binding connector comprising:
   a binding member including a pair of elongated parallel posts integrally extending from a common head, an integral rim extending from said common head adjacent root portions of said posts, an open groove bifurcating said rim to separate said posts, said posts including at least one inwardly facing ratcheted surface extending above said open groove;
   a locking collar having a pair of matching through-apertures, an integral medial cross-bar extending between and separating said apertures, and at least one pawl hingedly mounted to said cross-bar, said apertures including oppositely disposed sections, corresponding to and allowing sliding passage of said posts therepast;
   wherein said posts are insertable into at least one paper sheets aperture from one side of a stack of apertured paper sheets and through said locking collar, said locking collar including a head juxtaposed to a paper sheets aperture on an opposite side of said stack of apertured paper sheets;
   wherein at least one pawl ratchets along said at least one ratcheted surface until said posts common head and said locking collar head clamp a stack of apertured paper sheets together; excess length of said posts being frangibly breakable across a cross section of said posts from a root of one ratchet of said ratcheted surface across said posts generally in a plane of an exterior surface of said locking collar head;
   further including means for shearing said at least one pawl from said cross-bar to debind said binding connector, wherein said binding member open groove bifurcating said rim accommodates said at least one pawl after said at least one pawl has sheared from said crossbar; and
   wherein said means for shearing includes an essentially flat push disc having a through aperture to accommodate said posts and finger-engageable and locking collar-engageable surfaces for ratcheting said locking collar along said posts to a position to clamp said stack of apertured paper sheets together.

15. The binding connector of claim 14 wherein said push disc has a thickness greater than the spacing between said posts and is insertable between said posts to frangibly break off excess length of one of said posts extending from said locking collar.

16. The binding connector of claim 15 wherein said push disc includes a beveled edge insertable into sliding contact with an inner surface of one of said posts for frangibly breaking off excess length of said one of said posts.

* * * * *